D. CANTWELL.
CUTTING APPARATUS.
APPLICATION FILED MAY 10, 1915.
1,194,599.
Patented Aug. 15, 1916.
2 SHEETS—SHEET 1.
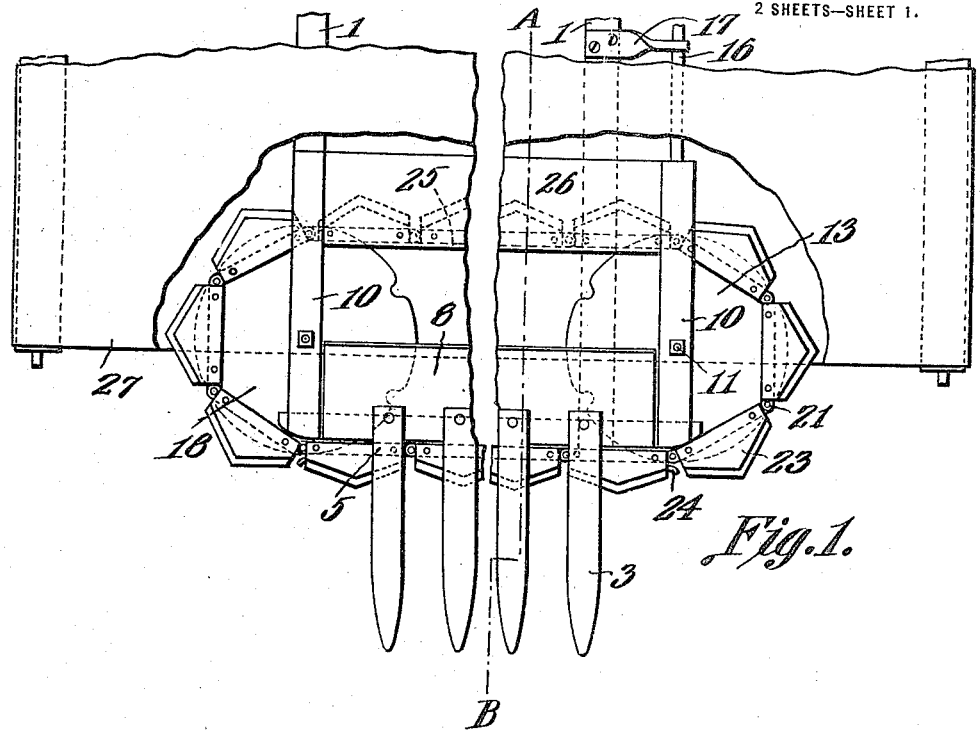
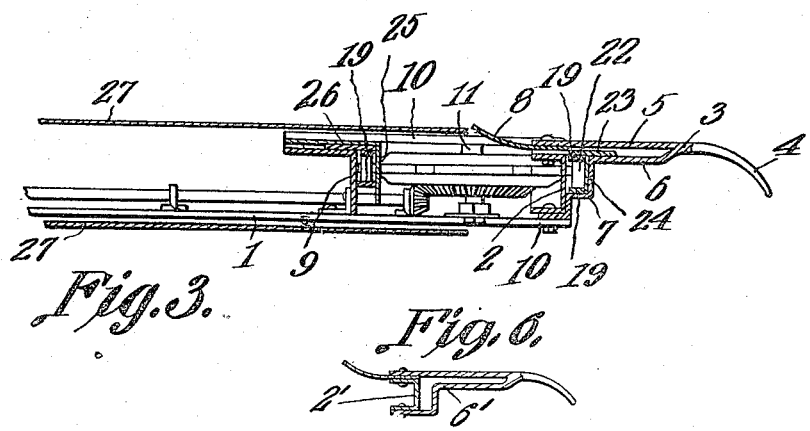
Witnesses
David Cantwell,
Inventor
by
Attorneys

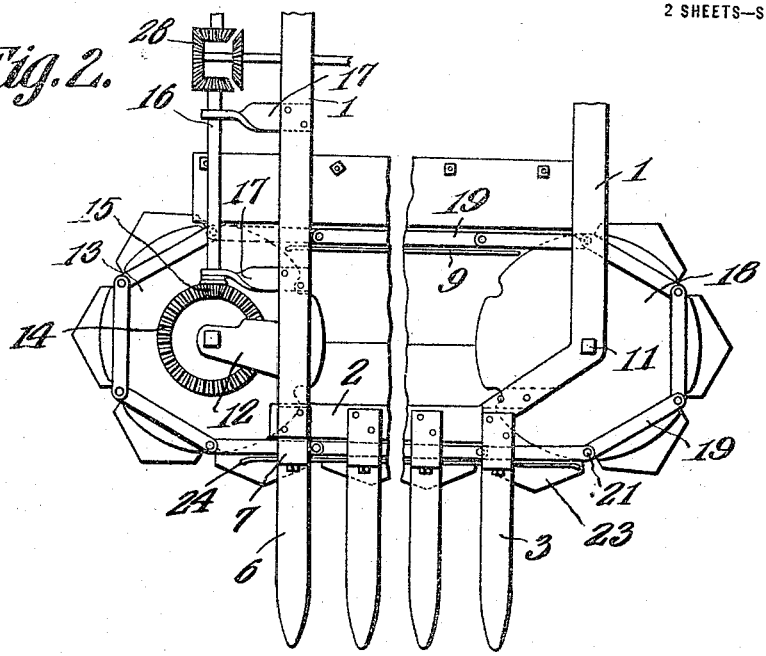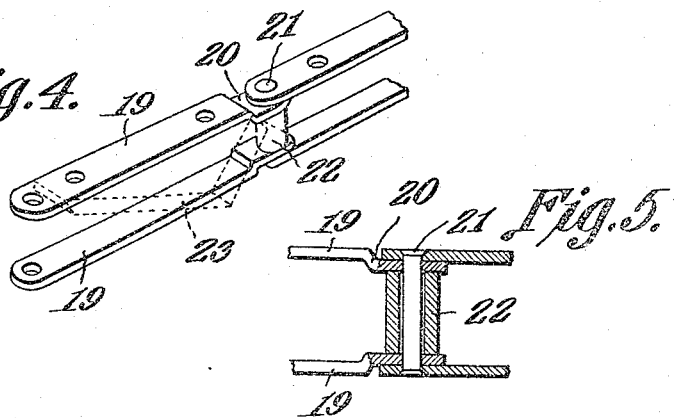

UNITED STATES PATENT OFFICE.

DAVID CANTWELL, OF CONDON, OREGON.

CUTTING APPARATUS.

1,194,599.   Specification of Letters Patent.   Patented Aug. 15, 1916.

Application filed May 10, 1915. Serial No. 27,165.

*To all whom it may concern:*

Be it known that I, DAVID CANTWELL, a citizen of the United States, residing at Condon, in the county of Gilliam and State of Oregon, have invented a new and useful Cutting Apparatus, of which the following is a specification.

This invention relates to machines for harvesting grain such as wheat, oats, barley and the like, one of the objects of the invention being to provide an endless sickle, the cutting elements of which are in the form of blades detachably mounted upon the links of a chain so that, during the actuation of the sickle, the same will operate continuously to harvest the grain, thus avoiding the undesirable noise and jolting produced by reciprocating sickles and at the same time reducing the power necessary to operate the machine.

Another object is to provide a simple and compact cutting mechanism which either can be constructed as a part of a harvester or header or can be readily applied to a harvester or header already in use at but slight cost.

A further object is to provide cutting mechanism which can be supported close to the ground and which has combined with it an endless conveyer or draper extending throughout the length of the cutting element so as to receive all straw which may be severed by the knives.

A further object is to provide an endless sickle which can be operated so as to cut either toward the right or toward the left so that, by utilizing knives having outwardly converging cutting edges, after one edge on each knife has become worn as a result of the actuation of the sickle in one direction, the movement of the sickle may be reversed so as to bring the other edge of the knife into use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a plan view of cutting mechanism embodying the present improvements, parts thereof being removed. Fig. 2 is a bottom plan view of the structure shown in Fig. 1, the draper or conveyer being removed. Fig. 3 is a section on line A—B Fig. 1. Fig. 4 is a detail view of a portion of the sickle chain, one of the knives being indicated by dotted lines. Fig. 5 is an enlarged section through a portion of the chain. Fig. 6 is a section through a portion of a slightly modified structure.

Referring to the figures by characters of reference 1 designates forwardly extending arms adapted to be connected in any suitable manner to a harvester structure and the front ends of these arms are connected by a front channeled beam 2 from which extend the forwardly projecting fingers 3. The forward or free ends of the fingers may be curved downwardly, as shown at 4 and the rear portions of the fingers are divided into spaced upper and lower arms 5 and 6, the upper arms being secured upon the top of the beam 2 while the lower arms 6 have their rear portions stepped as shown at 7 and extended under and secured to the beam 2. The spaces formed between the arms 5 and 6 are adapted to receive the knives of the sickle while the spaces formed between the stepped portions 7 of the arms 6 and the front of the beam 2 are adapted to receive a chain on which the knives are mounted, as hereinafter set forth. A guide plate 8 has its front edge extended under the rear ends of the arms 5 and over the beam 2, this plate being extended throughout the length of the beam and being inclined upwardly and rearwardly. A rear cross beam 9 connects the arms 1 and is parallel with the front beam 2. The ends of the front and rear beams 2 and 9 are connected by side strips 10 and depending from each of these side strips at a point between the beams 2 and 9 is a stud 11. The lower end of one of these studs is secured in one of the arms 1 while the lower end of the other stud is secured in a bracket 12 extending laterally from the other arm 1. Mounted for rotation on this last named stud is a sprocket 13 the lower face of which is provided with a gear 14, this gear being constantly in mesh with a smaller drive gear 15. This drive gear is secured to one end of a forwardly extending shaft 16 journaled in brackets 17 extending laterally from the adjacent arm 1 and the said shaft 16 may be driven in any suitable manner, it being designed to provide mechanism whereby the shaft can be rotated in either direction. Inasmuch as this drive mechanism can be of any well known type and does not constitute any part of the present invention, it is not deemed necessary to describe and illustrate it in detail. Another sprocket 18 is mounted for rotation on the other stud 11, the two sprockets 13 and 18 extending laterally beyond the arms 1 and the side strips 10 and the two sprockets engaging an endless chain, a portion of which is shown in detail in Fig. 4. The chain is made up of parallel links 19, each link having one end offset, as shown at 20, so as to be lapped by one end of the next adjoining link. These lapping portions of the links engage pivot pins 21 and mounted on these pins and between the links are combined spacing sleeves and rollers 22. Each of the upper links 19 of the chain has a sickle knife 23 riveted or otherwise secured thereto, the cutting edges of each knife converging forwardly to a point so that the sickle will operate as efficiently when moving in one direction as when moving in the opposite direction. The sprockets are so arranged that the straight front flight of the chain will travel in the spaces formed between beam 2 and the stepped portions 7 of the fingers 3 while the knives 23 will project into the spaces formed between the arms 5 and 6, as shown in Fig. 3, thus coöperating with the fingers to sever the grain engaged thereby.

In order that the straw and the like may be prevented from getting between the links of the chain and clogging the chain, a guard strip 24 is arranged in front of the front flight of the chain and is secured to the stepped portions 7 of the fingers 3, this guard strip extending throughout the length of the space between the side strips 10 and having its terminals curved outwardly, as shown in Fig. 1. Another guard strip 25 extends downwardly between the sprockets 13 and 18 and close to but in front of the rear flight of the chain, this strip being supported by a flange 26 which bears downwardly on and is secured to the rear beam 9.

An endless draper or conveyer 27 is arranged with its upper flight above the rear flight of the endless chain and with its lower flight under the arms 1, the upper or active flight of the draper being extended close to and under the rear edge of the plate 8. It will be seen that all of the mechanism of the cutter is disposed within the bounds of the draper or conveyer. This conveyer may be operated by any suitable mechanism, not shown, and it will be apparent that as it extends throughout the width of and beyond the cutting mechanism, all of the straw cut by this mechanism will be directed onto the conveyer.

The structure herein described is advantageous because of its compactness, it being possible to bring it very close to the ground if so desired. Furthermore as the blades are carried by a continuously moving chain, the noise and jolting produced by the reciprocation of a sickle bar is eliminated. After the machine has been driven in one direction until one edge of each knife has become worn or dull, the movement of the chain can be reversed so as thus to bring the other edge into action.

It is to be understood that shields or protectors of any suitable construction can be placed wherever deemed necessary in order to prevent injury to the knives after passing beyond the ends of the series of fingers and for preventing injury to the operators.

It is to be understood that when both edges of a knife become worn to an undesirable extent or when a knife becomes broken or otherwise rendered unfit for further use, the said knife can be readily removed from the chain by cutting the rivet and a new knife can then be substituted.

The mechanism employed for reversing the movement of the chain has been indicated generally at 28 but it is to be understood that I do not restrict myself to the particular mechanism shown as various other means may be utilized if desired.

By referring to Fig. 3 it will be seen that the knives carried by the chain are supported by the rear beam 9 as they travel with the rear flight of the chain. Thus twisting of the chain is prevented where a very long chain is used as, for example, in a machine adapted to make a cut of ten feet or more in width.

In order to bring the cutting members closer to the ground, the structure can be modified as shown in Fig. 6, wherein the arms 6' are not extended downwardly as far from the arms 5, as in the other structure described. Consequently, the links of the chain carrying the cutters will be supported nearer the bottom of the channel beam 2'.

By arranging the cutter actuating mechanism entirely between the upper and lower flights of the draper, the mechanism is rendered more compact than would otherwise be possible and, furthermore, the bottom of the draper acts as a guard to prevent grass and the like from becoming entangled in the cutting mechanism.

What is claimed is:—

A portable structure including a beam, forwardly and downwardly curved fingers each including an upper arm extending rearwardly to a position above the beam, a lower arm stepped downwardly and extending under and secured to the beam, a guide plate secured at one edge between the upper arm of the beam and the upper arms of said fingers and extending rearwardly from the beam, a chain working between said beam and the stepped portion of the lower arm of the finger, cutters carried by said chain and movable between the upper and lower arms of the finger, and a draper having its upper flight extending close to and adapted to receive material from the guide plate.

In testimony that I claim the foregoing as my own, I have hereto affixed my signature in the presence of two witnesses.

DAVID CANTWELL.

Witnesses:
T. A. WEINKE,
C. W. LAUGHRIGE.

Copies of this patent may be obtained for five cents each, by addressing the "Commissioner of Patents, Washington, D. C."